(No Model.)
H. S. GRANNIS.
TINSMITH'S SHEARING DEVICE.
No. 548,536. Patented Oct. 22, 1895.
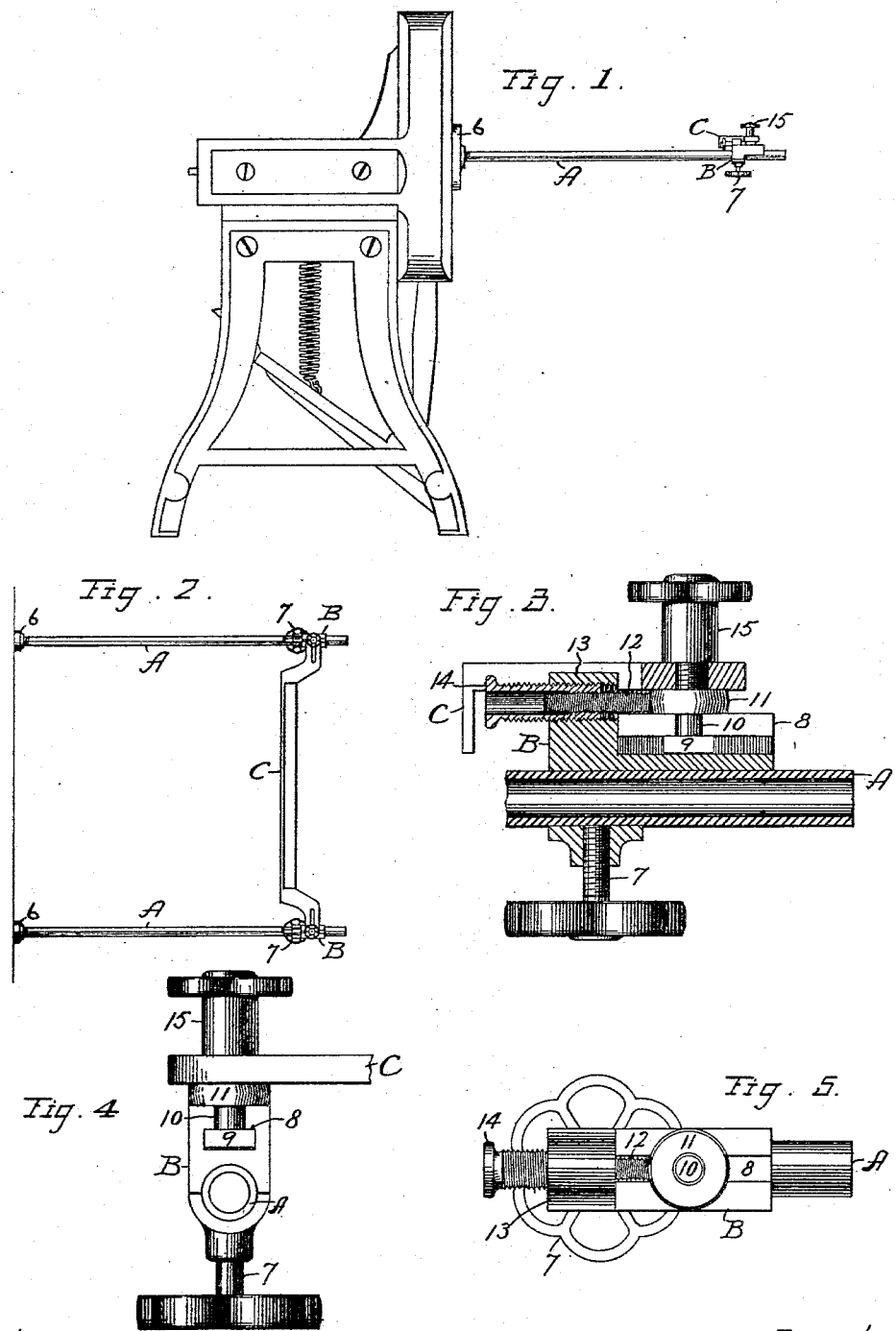

UNITED STATES PATENT OFFICE.

HIAL S. GRANNIS, OF PLANTSVILLE, ASSIGNOR TO THE PECK, STOW & WILCOX COMPANY, OF SOUTHINGTON, CONNECTICUT.

TINSMITH'S SHEARING DEVICE.

SPECIFICATION forming part of Letters Patent No. 548,536, dated October 22, 1895

Application filed June 3, 1895. Serial No. 551,519. (No model.)

*To all whom it may concern:*

Be it known that I, HIAL S. GRANNIS, a citizen of the United States, residing at Plantsville, in the county of Hartford and State of Connecticut, have invented certain new and useful Improvements in Tinsmiths' Shearing Devices, of which the following is a specification.

My invention relates to improvements in gage attachments for tinsmiths' shears; and the objects of my improvement are simplicity and economy in construction and general efficiency and convenience of the attachment.

In the accompanying drawings, Figure 1 is a side elevation of a machine such as my gage attachments are designed for, together with my attachment secured thereon. Fig. 2 is a plan view of the attachment with a base-line to indicate the shear-slide to which the attachment is secured. Fig. 3 is an enlarged vertical section of the principal portion of the attachment at one side of the machine, the plane of section extending centrally and longitudinally through one of the gage-rods, some of the parts being in elevation. Fig. 4 is a rear elevation of the parts shown in Fig. 3. Fig. 5 is a plan view of a portion of said parts.

The shears proper are or may be the same as those in common use. Upon the back of the shears, preferably attached to the frame or slide which carries the vertically-moving blade, I place two flanged hubs 6 6, internally threaded to receive the threaded ends of the gage-rods A A. I prefer to make these rods of piping so, that rods of any desired length may be screwed into the hubs 6 6, longer or shorter gage-rods being used at any time as occasion may require.

Upon each gage-rod A, I arrange a sliding gage-block B, said blocks being longitudinally perforated to receive the rods A and provided with a set-screw 7, by which they may be fastened at any desired point on the gage-rods. The upper part of each of the blocks B is provided with longitudinal ways 8 of the proper form to permit the head 9 of the bolt 10 to slide therein and to hold it from rotation and from being pulled endwise out of place. The body of said bolt 10 projects upwardly from the ways at the top of the gage-block. A gage-seat 11 in the form of an eye sets over this bolt 10, as shown, and said seat is provided with a threaded stem or shank 12. The gage-block is also provided with a lug 13, which is bored and threaded to receive an adjusting-screw 14, fitted to screw into said lug, while the screw 14 is also bored longitudinally and threaded internally to receive the threaded stem 12 of the gage-seat 11. The screw 14 and stem of the gage-seat stand in alignment with the bolt-head ways, although in a higher plane. The threads are right and left handed respectively, as in other double-screw adjusting devices; but, if desired, the adjustment may be made with only a single screw for each gage-seat—as, for example, by substituting for the screw 14 an adjusting-nut, free to rotate but held against longitudinal movement with the stem of the gage-seat screwed into it. As before implied, there is a gage-block and the parts connected with it upon each of the gage-rods.

C is an ordinary back-gage slotted at each end and placed upon the gage-seats of the gage-blocks with the bodies of the bolts 10 extending through said slotted ends. The upper ends of the bolts 10 are provided with hand-nuts 15, which may be screwed down upon the slotted ends of the gage C to hold it firmly on its seats. These hand-nuts are shown in side elevation in the sectional view, Fig. 3. The gage and hand-nut are omitted in Fig. 5 in order to better show the eye form of the gage-seats 11.

Gage-rods of the desired length for any particular work are screwed into the hubs 6, as shown. The gage-blocks B B are slipped upon said rods and the gage C placed on said blocks. The blocks are then slipped along on the gage-rods to approximately the desired positions, where they are secured by tightening up the set-screws 7. The hand-nuts 15 are loosened a little, just enough to free the bolt-heads 9 in the bolt-head ways 8, the gage pushed back as far as it can be on the bolts, and then the adjusting-screws are turned to adjust each end of the gage nicely to the exact position required. The hand-nuts are now tightened up to firmly secure the gage against accidental displacement.

I claim as my invention—

The combination of the gage rod A gage block B arranged to slide thereon, provided with a fastening device and having bolt head ways, the bolt 10 within said ways, the gage seat on said bolt, the gage on said seat, the hand-nut, and the screw adjusting devices for moving said gage seat and bolt along the ways of said sliding block, substantially as described and for the purpose specified.

HIAL S. GRANNIS.

Witnesses:
 FRANCIS S. STOW,
 FREDERICK C. ELY.